C. C. DE AVILA & A. M. REMINGTON.
CROSSCUT SAW TOOTH GAGE.
APPLICATION FILED OCT. 18, 1916.
1,222,188.
Patented Apr. 10, 1917.
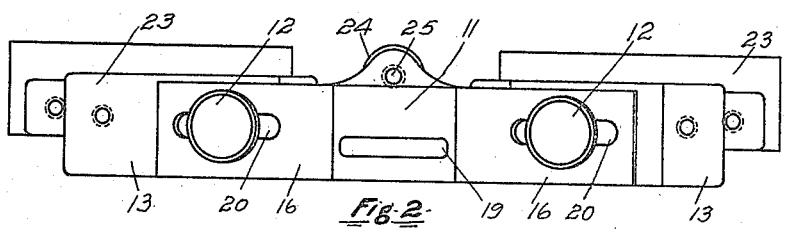
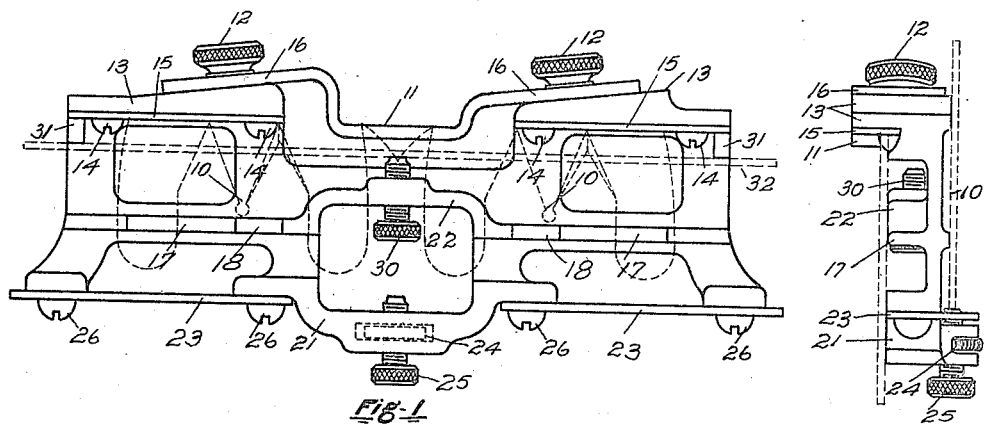
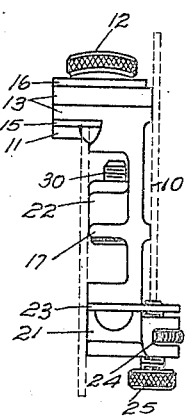
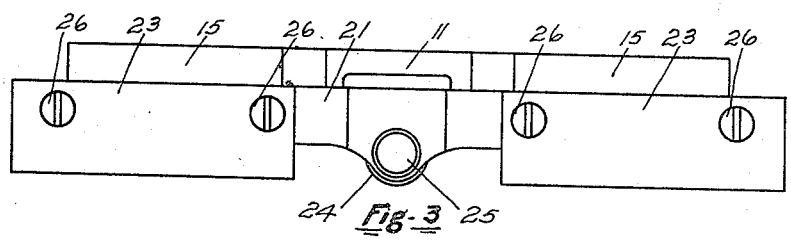
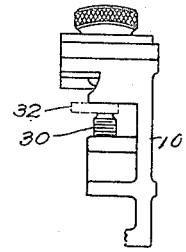
Inventors
Christiano C. de Avila
Alfred M. Remington

UNITED STATES PATENT OFFICE.

CHRISTIANO C. DE AVILA AND ALFRED M. REMINGTON, OF FITCHBURG, MASSACHUSETTS, ASSIGNORS TO SIMONDS MANUFACTURING COMPANY, OF FITCHBURG, MASSACHUSETTS, A CORPORATION OF MASSACHUSETTS.

CROSSCUT-SAW-TOOTH GAGE.

1,222,188.  Specification of Letters Patent.  Patented Apr. 10, 1917.

Application filed October 18, 1916. Serial No. 126,311.

*To all whom it may concern:*

Be it known that we, CHRISTIANO C. DE AVILA, a citizen of the Republic of Portugal, and ALFRED M. REMINGTON, a citizen of the United States of America, both residing at Fitchburg, in the county of Worcester and State of Massachusetts, have invented an Improvement in Crosscut-Saw-Tooth Gages, of which the following is a specification.

The invention relates to a gage by which the teeth of cross-cut saws may be filed to any desired length, or to a uniform length if uneven, especially the so-called raking teeth of the saw. Our improvements consist in the novel means for adjusting the filing rack for the raking teeth by which it is always positively maintained in a plane parallel with the guide plates against which the other teeth bear, whatever the adjustment of the rack may be, whether great or small, and in the arrangement of a file for breasting the saw teeth, and the usual screw gage, for testing the length of the teeth either before or after the filing, is also shown.

In the drawings forming a part of this specification,

Figure 1 is a side elevation of the gage;

Fig. 2 with reference to Fig. 1 is a top plan view;

Fig. 3 is a bottom plan view;

Fig. 4 is an end elevation viewed from the right of Fig. 1; and

Fig. 5 is also a similar end view showing the breasting file in its outward position, ready for use.

Referring to the drawings by designating numerals, 10 is the frame of the device, with portions cut away, for sake of economy in weight and material, 11, is a hardened steel adjustable filing rack, having a slot 19 through which the ends of the raking teeth project when the gage is in use, and which serves to determine the amount to be filed off from their tips. The rack 11 is bent downwardly at the middle portion at the location of the slot 19, and the ends 16 thereof are respectively bent, one upwardly and the other downwardly, into parallel planes inclined at the same angle to the middle or slotted portion, which latter is parallel to the guide plates 15 against which the cutting teeth rest. The respective ends 16 of the rack 11 rest upon the upper surfaces of the flanges 13 at the top of each end of the frame; such upper surfaces are inclined at the same angle as the ends 16 of the rack 11, which rest upon and are adjustable up or down on those surfaces. These inclined ends 16 are also slotted and by means of screws 12 the rack 11 may be secured in any position on the inclined surfaces of the flanges 13, to which they are adjusted, and although the portion 11 is raised or lowered by the movement of the portions 16 to the right or to the left on flanges 13, that slotted portion 11 invariably remains parallel to the tooth guide plates 15, so that the points of the raking teeth which project through the slot in the part 11 may be filed off to a uniform height. The frame is cut away or depressed at the middle portion of its upper edge to accommodate the part 11 of the rack.

The file 32 for breasting the saw teeth is conveniently held by the screw 30 which bears upon the middle portion thereof, the ends of the file resting against the lugs 31 at each end of the frame, and the space above the screw 30 may be made deep enough laterally so that the file may be pushed inward sufficiently to be out of line with the saw plate when the raking teeth are to be cut to the gage 11.

The plates 23 are attached to the lower edge of the frame and upon these rest the saw teeth, and by means of the screw 25 the amount to be filed from the points of the raking teeth may be measured. When the screw 25 has been adjusted to the desired position it may be securely held by the locknut 24.

The position of the saw teeth in relation to the gage when in use is indicated by dotted lines in Figs. 1 and 4.

We claim:

A cross-cut saw-tooth gage, consisting of a frame having a depression at the middle portion of its upper edge with flanges at either side thereof, and a saw-tooth bearing plate secured beneath each flange, the upper surfaces of the flanges having the same angle of inclination to the bearing plates and longitudinally thereof, in planes the extensions of which are parallel, a gage plate the ends of which rest upon the inclined surfaces of the flanges and are respectively inclined at the same angle therewith, and an intermediate portion of the gage plate coincident with the depression in the frame and which is parallel with the said bearing plates and is provided with a longitudinal slot through which the raking teeth may protrude, to gage the amount to be removed therefrom when the gage is used.

CHRISTIANO C. DE AVILA.
ALFRED M. REMINGTON.

Copies of this patent may be obtained for five cents each, by addressing the "Commissioner of Patents, Washington, D. C."